(12) United States Patent
Shen et al.

(10) Patent No.: US 7,120,018 B2
(45) Date of Patent: Oct. 10, 2006

(54) MOTHER BOARD WITH A VENTILATION-ENHANCING MEMBER

(75) Inventors: Chen-Lai Shen, Taipei (TW); Chuan-Te Chang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 121 days.

(21) Appl. No.: 10/916,483

(22) Filed: Aug. 12, 2004

(65) Prior Publication Data
US 2005/0036288 A1    Feb. 17, 2005

(30) Foreign Application Priority Data
Aug. 12, 2003   (TW) ............................... 92122145 A

(51) Int. Cl.
*H05K 7/20*   (2006.01)
(52) U.S. Cl. ...................... 361/695; 361/690; 361/691; 361/694; 361/696; 361/697; 361/718; 361/719; 361/720; 165/80.3; 165/185; 174/16.3; 257/706; 257/707; 257/713
(58) Field of Classification Search ................ 361/687, 361/694–695, 697, 703, 690–691, 696, 718–720; 165/80.3, 121, 122, 185; 454/184; 174/16.3; 257/706–707, 713
See application file for complete search history.

(56) References Cited

U.S. PATENT DOCUMENTS

| | | | | |
|---|---|---|---|---|
| 4,901,138 A | * | 2/1990 | Kushibiki et al. .......... 257/721 |
| 5,694,294 A | * | 12/1997 | Ohashi et al. .............. 361/687 |
| 5,793,608 A | * | 8/1998 | Winick et al. .............. 361/695 |
| 5,873,407 A | * | 2/1999 | Wang et al. ................ 165/80.3 |
| 6,483,699 B1 | * | 11/2002 | Salmonson et al. ......... 361/687 |
| 6,704,196 B1 | * | 3/2004 | Rodriguez et al. .......... 361/687 |
| 6,807,057 B1 | * | 10/2004 | Rubenstein et al. ........ 361/697 |
| 6,972,950 B1 | * | 12/2005 | Wyatt et al. ................ 361/687 |
| 6,989,988 B1 | * | 1/2006 | Arbogast et al. ........... 361/695 |
| 6,999,312 B1 | * | 2/2006 | Garnett et al. .............. 361/687 |
| 2004/0246676 A1 | * | 12/2004 | Barr et al. .................... 361/697 |

FOREIGN PATENT DOCUMENTS

DE          3012067 A1  * 10/1981
JP          10-012781      * 1/1998

* cited by examiner

*Primary Examiner*—Michael Datskovsky
*Assistant Examiner*—Robert J. Hoffberg
(74) *Attorney, Agent, or Firm*—Birch, Stewart, Kolasch, and Birch, LLP

(57) ABSTRACT

A mother board includes a CPU, a suction fan mounted on the CPU for dissipating heat resulting from operation of the CPU, a north bridge chip disposed downstream to the suction fan, a power-consumption component disposed at one side of the CPU, and a ventilation-enhancing member disposed above the chip and capable of diverting an air flow of the suction fan toward the power-consumption component.

17 Claims, 4 Drawing Sheets

Under 33 °C environment

| Ventilation enhancing member | Operating state | Temperature within computer casing (°C) | Temperature of north bridge chip (°C) | Average temperature of power-consumption components (°C) |
|---|---|---|---|---|
| Absence | Before power on | 33 | 33 | 33 |
| | After power on | 33 | 34 | 40 |
| | 1 hr after maximum operation of the computer | 47 | 60 | 81 |
| | Rise in temperature | 14 | 26 | 41 |
| Presence | Before power on | 33 | 33 | 33 |
| | After power on | 33 | 34 | 39 |
| | 1 hr after maximum operation of the computer | 48 | 64 | 65 |
| | Rise in temperature | 15 | 30 | 26 |

Fig.3

MOTHER BOARD WITH A VENTILATION-ENHANCING MEMBER

This Nonprovisional application claims priority under 35 U.S.C. § 119(a) on Patent Application No(s). 092122145 filed in Taiwan, Republic of China on Aug. 12, 2003, the entire contents of which are hereby incorporated by reference.

FIELD OF THE INVENTION

The invention relates to a mother board, more particularly to a mother board of a computer that includes a central processing unit, a suction fan for dissipating heat resulting from operation of the central processing unit, and a ventilation-enhancing member mounted thereon in such a manner to divert an air flow of the suction fan to lower temperature of peripheral components that are mounted at one side of the central processing unit, thereby prolonging the service life of the mother board.

BACKGROUND OF THE INVENTION

A central processing unit, and a chip set assembly (such as a north bridge chip set, a south bridge chip set) of the new version are provided with precise and complicated structure in such a manner to result in high performance and fast computing power thereof. As the computing capability of the PC increases, the temperature of the central processing unit and the chip set assembly subsequently gets higher when under operation. It is the trench and object of the manufacturers of the mother board to lower the temperature of these components around the central processing unit so as to prevent from malfunction due to the rise in the temperature of electronic components around the central processing unit.

A heat dissipating device is provided on the mother board, and includes a first suction fan disposed on the central processing unit via a heat sink and a second suction fan mounted on the computer housing. The heat sink on the first suction fan has a fin configuration so as to be adapted to guide the airflow toward the chip assembly in order to lower the actual temperature of the chip assembly. The second suction fan on the computer housing draws the air outwardly so as to cause an air circulation, which, in turn, results in an increase of the air density within the computer housing so as to enhance the heat dissipating effect of the CPU and the chip assembly.

FIG. 1 is a fragmentary view of a conventional mother board 1 which includes a CPU 2, a suction fan 12 mounted on the CPU 2 via a first heat sink 11, and a plurality of electronic components. The electronic components may includes a RAM (random access memory) module disposed at a left side of the CPU 2, and a row of capacitors 14 and a row of power-consumption components 15 disposed at a right side of the CPU 2. A north bridge chip set 3 (not visible) is mounted on the mother board 1 at a rear side of the CPU 2. A second heat sink 16 is mounted above the north bridge chip set 3, and is formed with a plurality of fins 16a for heat dissipation. An expansion card 17 is disposed adjacent to the second heat sink 16 away from the CPU 2. The first heat sink 11 is formed with a plurality of fins (not visible since covered by the suction fan 12) so as to guide the air flow from the suction fan 12 toward the second heat sink 16, thereby lowering the temperature of outer surface of the north bridge chip set 3.

It is noted that in addition to the north bridge chip set 13, the power transistors (mostly made up of MOSFET) disposed at the right side of the CPU generates a relatively high temperature under operation. Under the predetermined output rate, the temperature of the power transistors 15 may exceed 100° C. Though these power transistors 15 can operate under a temperature that is higher than that of the CPU or the chip assembly, the constant operation of the power transistors above 100° C. can result in melting of the tin, which is used for mounting the power transistors on the mother board. Since the mother board 1 is mounted uprightly in the computer housing, displacement and disengagement of these power transistors on or from the mother board 1 can adversely affect the functions of the mother board 1.

SUMMARY OF THE INVENTION

The object of the present invention is to provide a mother board having a ventilation-enhancing member mounted thereon in such a manner to divert an air flow of the suction fan so as to lower temperature of peripheral components that are mounted around a central processing unit.

According to the present invention, a mother board is provided to include: a central processing unit; a fan mounted on the central processing unit for dissipating heat generated by operation of the central processing unit; a power-consumption component disposed nearby the central processing unit and electrically connected to the central processing unit; and a ventilation-enhancing member including a blocking portion and a guiding portion, wherein the blocking portion is disposed downstream of and extending transversely to an air flow direction of the fan. The guiding portion extends from the blocking portion toward the power-consumption component, whereby the airflow resulting from operation of the fan is diverted to the power-consumption component.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and in which:

FIG. 3 is a table showing the temperatures of electronic components on the mother board prior to and after provision of a ventilation-enhancing member on the mother board;

DETAILED DESCCRIPTIONS OF THE PREFERRED EMBODIMENTS

Figure 1:
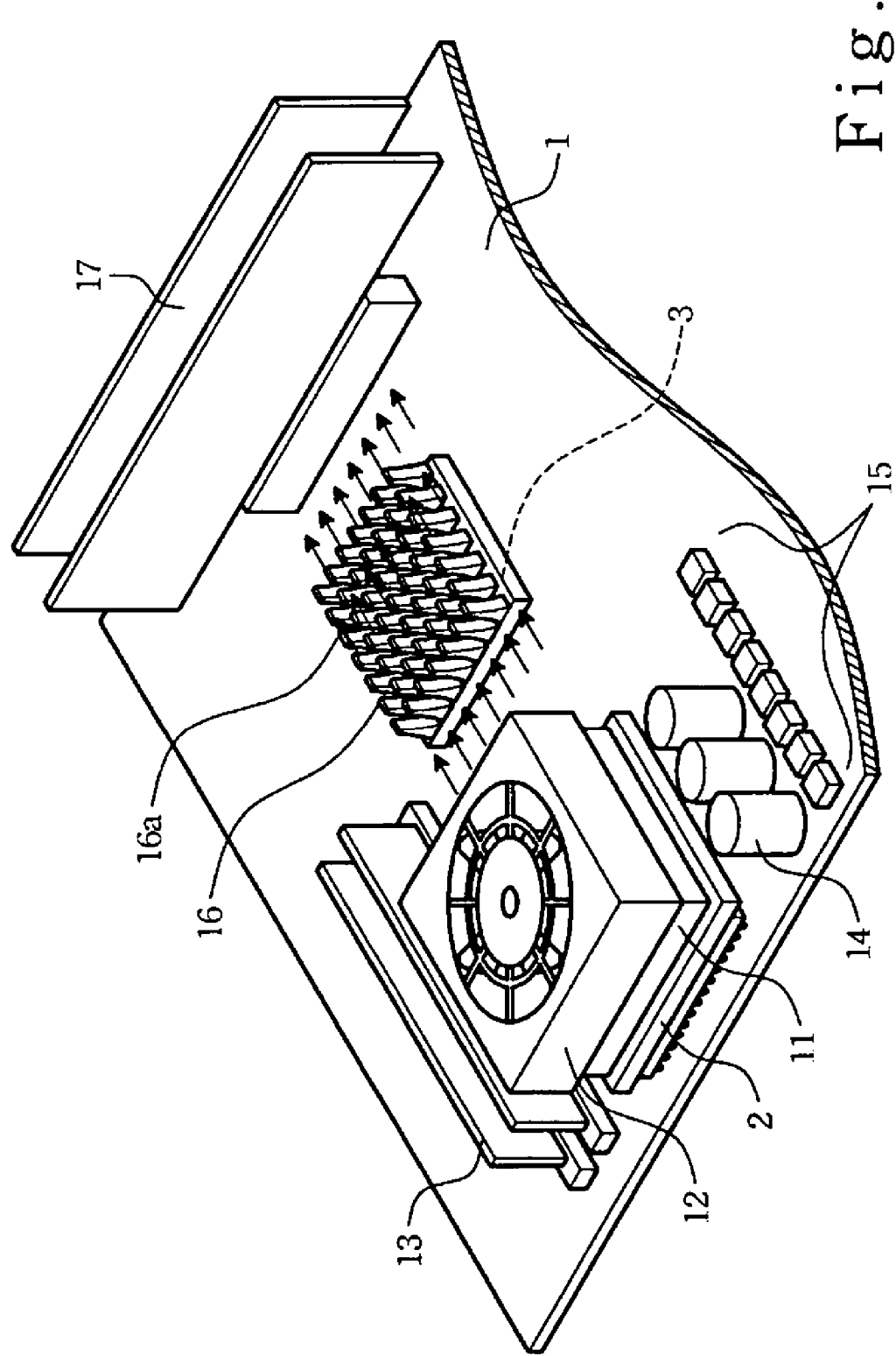
FIG. 1 is a fragmentary view, illustrating an air flow direction of a suction fan mounted on a CPU of a conventional mother board.

Before the present invention is described in greater detail with reference to the following preferred embodiments, it should be noted that same reference numerals have been used to denote similar elements throughout the specification.

Figure 2:
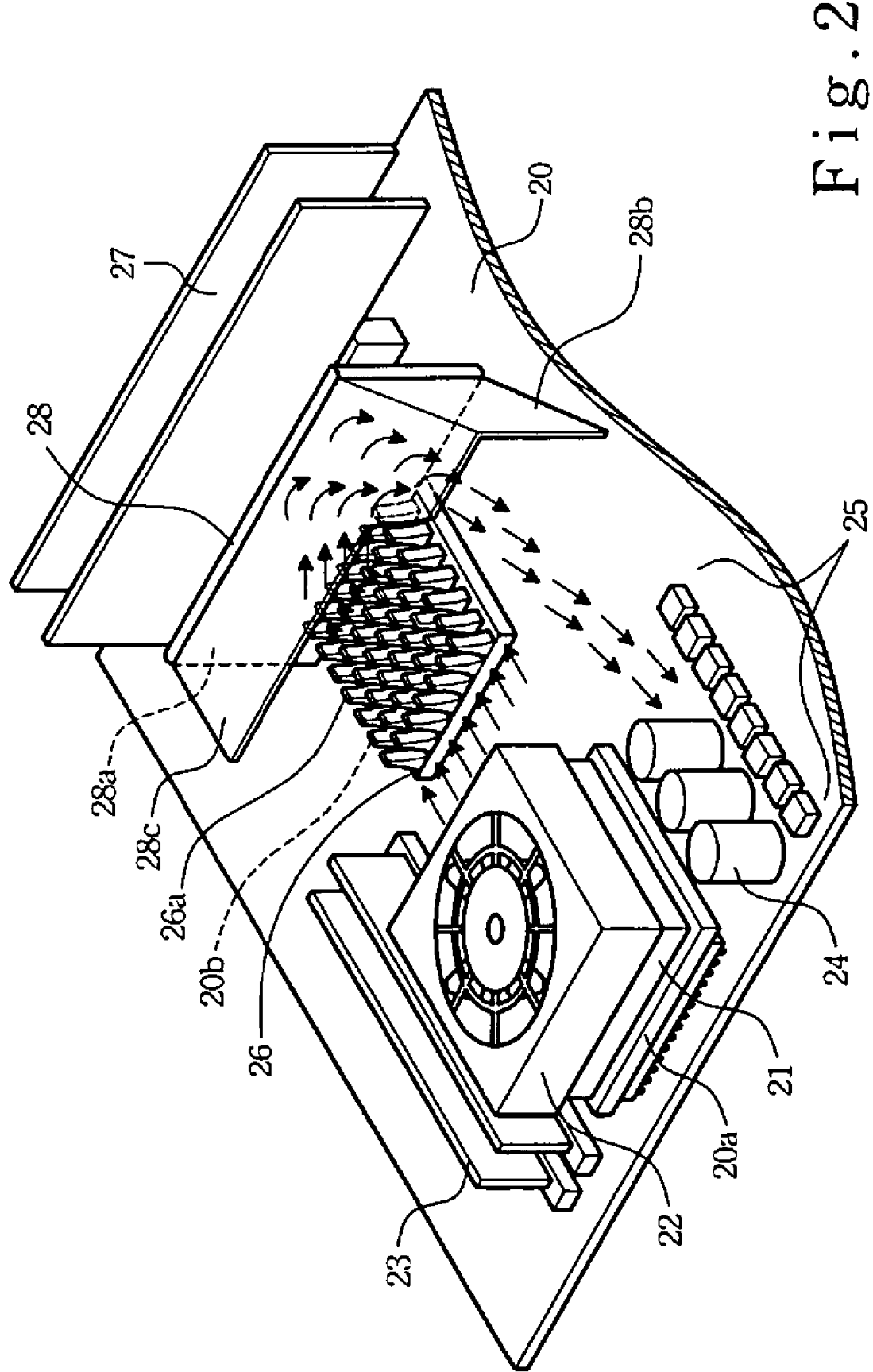
FIG. 2 is a fragmentary view, illustrating an air flow direction of a suction fan mounted on a CPU of the preferred embodiment of a mother board in accordance with to the present invention.

Referring to FIG. 2, a mother board 20 presently available in the market is used to explain the specific feature of the present invention. For those skilled in the art, the present invention should not be limited only to the mother board 20 as shown. The mother board 20 generally includes a CPU (central processing unit) 20a, a chip set (not visible), a plurality of power-consumption components, a suction fan 22, a first heat sink 21, a second heat sink 26, and a ventilation-enhancing member 28.

The central processing unit 20a is mounted on the mother board 20 via mounting holes formed through the mother board 20. The suction fan 22 is mounted on the central processing unit 20a for dissipating heat generated due to operation of the central processing unit 20a. The chip set (not visible) is mounted on the mother board 20, is electrically connected to the central processing unit 20a, and is disposed downstream of the suction fan 22. The chip set preferably includes a north bridge chip 20b and two expansion cards 27 that are inserted in the PCI slots. The power-consumption components may include a RAM module 23 disposed on the mother board 20 at a left side of the CPU 20a and electrically connected to the CPU 20a, a row of capacitors 24, and a row of power-transmitting components 25. The capacitors 24 and the power-transmitting components 25 are disposed at a right side of the CPU 20a, and are electrically connected to the CPU 20a.

The first heat sink 21 is disposed between the suction fan 22 and the central processing unit 20a, and has a plurality of fins (not visible since covered by the fan 22) so as to guide an air flow from the suction fan 22 toward the north bridge chip 20b. The second heat sink 26 is mounted above the north bridge chip 20b, and is formed with a plurality of fins 26a to enhance dissipating effects of the north bridge chip 20b.

The ventilation-enhancing member 28 is mounted on the mother board 20 adjacent to the second heat sink 26 in such a manner to divert the air flow toward the capacitors 24 and the power transmitting transistors 25. As shown in FIG. 2, the CPU 20a and the power-consumption components are located at the same side of the ventilation-enhancing member 28, and the airflow generated by the suction fan 22 will pass from the CPU 20a, via the north bridge chip 20b, to the power-consumption components. In other words, the ventilation-enhancing member 28 can reverse the airflow passing from the CPU 20a to toward the power-consumption components. The ventilation-enhancing member 28 includes a blocking portion 28a, a guiding portion 28b and a shielding portion 28c, and the CPU 20a and the power-consumption components are located at the same side of the blocking portion 28a as shown in FIG. 2. In order to enhance heat dissipation of the north bridge chip 20b, the blocking portion 28a can be mounted on the second heat sink 26, adjacent to one of two opposite sides of the north bridge chip 20b away from the central processing unit 20a. Under this condition, the blocking portion 28a is disposed at downstream of and extends transversely to the air flow direction of the suction fan 22. The guiding portion 28b extends obliquely from the blocking portion 28a, and has one end connected to the blocking portion 28a and the other end terminating at an exterior position of the power-consumption components in such a manner that the air flow resulting from operation of the suction fan 22 is diverted to the capacitors 24 and the power transmitting transistors 25 after colliding successively the blocking portion 28a and the guiding portion 28b. The shielding portion 28c extends from an upper end of the blocking portion 28a toward the central processing unit 20a so as to enhance in lowering the temperatures of the components 24, 25.

Preferably, the blocking portion 28a and the guiding portion 28b cooperatively define a curved portion at adjoining position therebetween. The blocking portion 28a and the guiding portion 28b are in plate configuration and cooperatively form a substantially generally L-shaped configuration. Alternately, the blocking portion 28a and the guiding portion 28b cooperatively define an angle ranging from 90° to 120°.

FIG. 3 shows a table, illustrating temperatures of the north bridge chip 20b and the electronic components 24,25 prior to and after provision of the ventilation-enhancing member 28 on the mother board 20. Note that the computer provided with the mother board 20 of the present invention is powered on under 30 degree centigrade. The temperature within an interior of the computer immediately rises from 30° C. to 40° C. One hour after outmost performance of the computer, the temperature rises from 40° C. to 47° C. The temperature of the north bridge chip 20b rises from 34° C. to 60° C. while the temperature of the components 24,25 rises from 40° C. to 81° C. Without employment of the ventilation-enhancing member 28 on the mother board 20, an increase of 41° C. in the components 24,25 can result in softening of the soldered tin (Sn) spots on the mother board 20.

When the mother board 20 is provided with the ventilation-enhancing member 28, and one hour after the outmost performance of the computer, there is only an increase of 26° C. in the components 24,25 in addition to its initial temperature. At the same time, the temperature within the computer housing rises from 39° C. to 65° C. The temperature of the north bridge chip 20b rises from 60° C. to 64° C. (that is an increase of 4° C.) and is still within the operating temperature. The functionality of the north bridge chip 20b is not affected, which, in turn, can prolong the service life the mother board 20.

It is understandable that arrangement of the ventilation-enhancing member 28 on the mother board 20 brings several advantages. Firstly, the heat-dissipating effect of the components 24, 25 is increased in addition to lowering the temperature on the outer surfaces thereof, which, in turn, can prolong the service life of the components 24,25. The operating system of the computer is subsequently stable. In other word, the components 24, 25 are capable of providing high transmitting power to the CPU 20a so that the latter can perform computing operation under high speed. There is no softening of the tin (Sn) spots in the mother board 20, which, in turn, does not affect functionality of the components 24,25. Under this condition, the components 24, 25 of low-rate quality can be utilized so as to reduce the manufacture cost of the mother board 20.

Figure 4A:
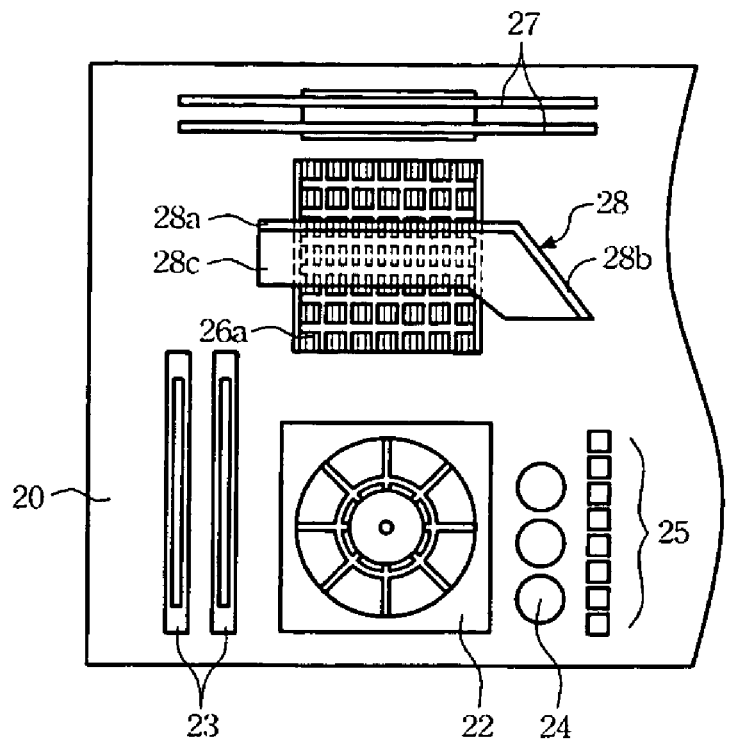
FIG. 4A is a top planar view, illustrating a modified preferred embodiment of the mother board according to the present invention.
Figure 4B:
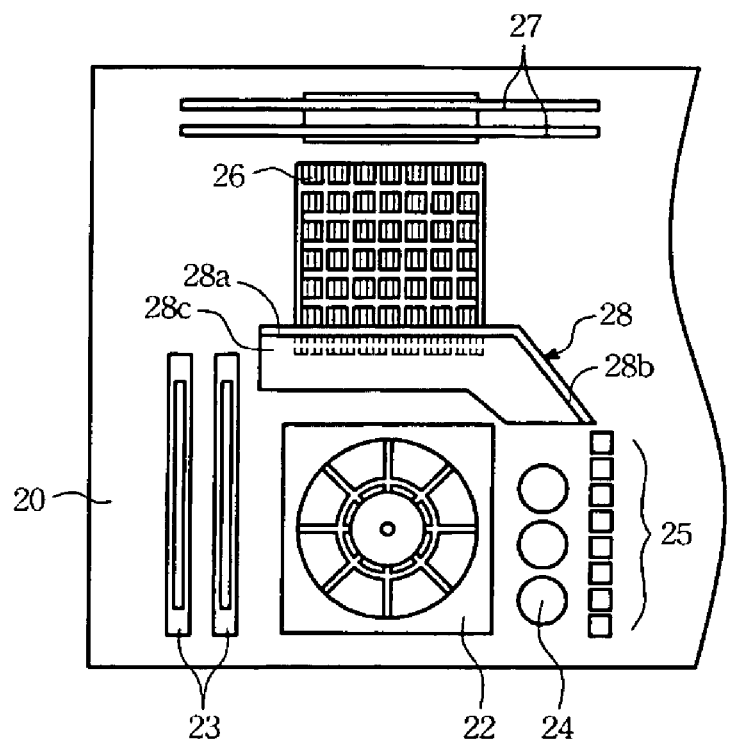
FIG. 4B is a top planar view, illustrating another modified preferred embodiment of the mother board according to the present invention.

Referring to FIGS. 4A and 4B, two modified preferred embodiments of a mother board 20 according to the present invention is shown to have a construction similar to the previous embodiment. The main difference resides in the blocking portion 28a of the ventilation-enhancing member 28 is disposed at an elevation above and extends along a center line of the second heat sink 26 (see FIG. 4A) while in FIG. 4B, the blocking portion 28a is disposed above the second heat sink 26a at one side thereof, which is adjacent to the suction fan 22.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A mother board comprising:
   a central processing unit;
   a fan mounted on said central processing unit for dissipating heat generated by operation of said central processing unit;
   a power-consumption component disposed nearby said central processing unit and electrically connected to said central processing unit; and
   a ventilation-enhancing member including a blocking portion and a guiding portion, wherein said blocking portion is disposed downstream of and extending transversely to an air flow direction of said fan, said guiding portion extending from said blocking portion toward said power-consumption component, whereby the air flow resulting from operation of said fan is diverted to said power-consumption component,
   wherein said central processing unit and said power-consumption component are located at the same side of the blocking portion, and said ventilation-enhancing member reverses the airflow passing from said central processing unit towards the power-consumption component.

2. The mother board according to claim 1, wherein said ventilation-enhancing member further includes a shielding portion extending from an upper end of said blocking portion for preventing the air flow from escaping.

3. The mother board according to claim 1, wherein said blocking portion and said guiding portion cooperatively define a curved portion at adjoining position therebetween.

4. The mother board according to claim 1, wherein said blocking portion and said guiding portion are respectively in plate configuration.

5. The mother board according to claim 1, wherein said blocking portion and said guiding portion cooperatively form a substantially L-shaped configuration.

6. The mother board according to claim 1, wherein said blocking portion and said guiding portion cooperatively define an angle ranging approximately from 90° to 120°.

7. The mother board according to claim 1, further comprising a north bridge chip set that is deposited between said central processing unit and said blocking portion, that is electrically connected to said central processing unit and that has two opposite sides, said blocking portion being disposed at one of said opposite sides of said north bridge chip set away from said central processing unit.

8. The mother board according to claim 2, further comprising a north bridge chip set that is electrically connected to said central processing unit and that is disposed between said central processing unit and said blocking portion, said shielding portion being disposed at an elevation above said north bridge chip set.

9. The mother board according to claim 1, wherein said guiding portion has one end connected to said blocking portion and the other end terminating adjacent to said power-consumption component.

10. A mother board comprising:
    a central processing unit;
    a fan mounted on said central processing unit for dissipating heat generated due to operation of said central processing unit;
    a chip set electrically connected to said central processing unit, disposed downstream to flow direction of said fan;
    a first heat sink disposed between said fan and said central processing unit to enhance dissipating effects of said central processing unit, said first heat sink having a plurality of fins so as to guide an air flow from said fan toward said chip set;
    a second heat sink mounted above said chip set to enhance dissipating effects of said chip set;
    a power-consumption component disposed nearby and electrically connected to said central processing unit offset from the air flow direction of said fan; and
    a ventilation-enhancing member mounted on said second heat sink in such a manner to divert the airflow of said fan toward said power-consumption component,
    wherein said central processing unit and said power-consumption component are located at the same side of the ventilation-enhancing member, and the airflow generated by said fan passing from said central processing unit, via said chip set, to said power-consumption component.

11. The mother board according to claim 10, wherein said ventilation-enhancing member includes a blocking portion extending transversely to the airflow direction of said fan and a guiding portion extending from said blocking portion.

12. The mother board according to claim 11, wherein said ventilation-enhancing member further includes a shielding portion extending from an upper end of said blocking portion toward said central processing unit.

13. The mother board according to claim 11, wherein said blocking portion and said guiding portion cooperatively define a curved portion at adjoining position therebetween.

14. The mother board according to claim 11, wherein said blocking portion and said guiding portion are in plate configuration.

15. The mother board according to claim 11, wherein said blocking portion and said guiding portion cooperatively form a substantially L-shaped configuration.

16. The mother board according to claim 11, wherein said blocking portion and said guiding portion cooperatively define an angle ranging from 90° to 120°.

17. The mother board according to claim 11, wherein said guiding portion has one end connected to said blocking portion and the other end terminating adjacent to said power-consumption component.

* * * * *